(12) United States Patent
Kärkkäinen

(10) Patent No.: US 8,615,137 B2
(45) Date of Patent: Dec. 24, 2013

(54) METHOD FOR RECOGNIZING PATTERN, PATTERN RECOGNIZER AND COMPUTER PROGRAM

(75) Inventor: Tuomas Kärkkäinen, Turku (FI)

(73) Assignee: Gurulogic Microsystems Oy, Turku (FI)

( * ) Notice: Subject to any disclaimer, the term of this patent is extended or adjusted under 35 U.S.C. 154(b) by 230 days.

(21) Appl. No.: 12/831,045

(22) Filed: Jul. 6, 2010

(65) Prior Publication Data

US 2011/0007971 A1  Jan. 13, 2011

(30) Foreign Application Priority Data

Jul. 13, 2009  (FI) .................................... 20095785

(51) Int. Cl.
*G06K 9/62* (2006.01)

(52) U.S. Cl.
USPC .......................................................... 382/209

(58) Field of Classification Search
USPC .................. 382/190, 103, 107, 181, 209–223
See application file for complete search history.

(56) References Cited

U.S. PATENT DOCUMENTS

| | | | | |
|---|---|---|---|---|
| 5,675,489 | A | 10/1997 | Pomerleau | |
| 5,805,727 | A * | 9/1998 | Nakano | 382/195 |
| 6,678,414 | B1 * | 1/2004 | Loce et al. | 382/209 |
| 7,283,645 | B2 * | 10/2007 | Krumm et al. | 382/103 |
| 2002/0168097 | A1 | 11/2002 | Neubauer et al. | |
| 2003/0091238 | A1 | 5/2003 | Plaza | |
| 2005/0041837 | A1 * | 2/2005 | Fan et al. | 382/103 |
| 2006/0126900 | A1 | 6/2006 | Mihara et al. | |
| 2006/0227997 | A1 * | 10/2006 | Au et al. | 382/103 |
| 2007/0092142 | A1 * | 4/2007 | Kuriathungal et al. | 382/209 |

(Continued)

FOREIGN PATENT DOCUMENTS

| | | | |
|---|---|---|---|
| JP | 11-85989 | A | 3/1999 |
| JP | 11085989 | A | 3/1999 |

(Continued)

OTHER PUBLICATIONS

Laine et al., "A Weighted Error Metric and Optimization Method for Antialiasing Patterns", Mar. 15, 2006, Computer Graphics Forum, vol. 25, iss. 1, p. 83-94.*

(Continued)

*Primary Examiner* — Stephen R Koziol
*Assistant Examiner* — Timothy Choi
(74) *Attorney, Agent, or Firm* — Robert P. Michal; Lucas & Mercanti, LLP

(57) ABSTRACT

The invention relates to a pattern recognizer, which, in order to recognize the pattern fast and with lowest possible computing power, comprises a memory (12) for storing area-specific reference values (REF) calculated on the basis of image information of image areas containing parts of the pattern to be recognized, and a processor (14) that is configured to divide (15) a received image into areas, to calculate (16) reference values (REF) area-specifically on the basis of the image information of said areas, to compare (17) the calculated reference values (REF) with the reference values (REF) stored in the memory (12) and to indicate (18) that the pattern is recognized, in case in the received image there is found a part consisting of adjacent areas, where the reference values (REF) of the areas correspond, with sufficient accuracy, to the reference values (REF) stored in the memory (12).

21 Claims, 3 Drawing Sheets

(56) References Cited

U.S. PATENT DOCUMENTS

2009/0060276 A1* 3/2009 Yu et al. .................. 382/103
2009/0080770 A1 3/2009 Jiang et al.
2009/0174773 A1* 7/2009 Gowdy et al. ............. 348/148

FOREIGN PATENT DOCUMENTS

| JP | 2009-76094 A | 4/2009 |
| RU | 2297039 C2 | 4/2007 |
| RU | 2361273 C2 | 7/2009 |

OTHER PUBLICATIONS

Nguyen et al., "Occlusion robust adaptive template tracking", Jul. 14, 2001, Proceedings Eighth IEEE Int. Conf. on Computer Vision, vol. 1, p. 678-683.*

Intel, "Appendix B: Interpolation Algorithms in Geometric Transforms: Super-sampling", 2000, Intel Image Processing Library Reference Manual, p. B-1-B-8.* http://web.archive.org/web/20070418033459/http://www.cs.gmu.edu/~kosecka/cs682/cs682-template-matching.pdf, julkinen, Apr. 18, 2007, pp. 1-58.

Communication dated Feb. 14, 2012 issue by the Finnish Patent Office in related Finnish Application No. 20095785 (5 pages).

English language translation of Communication dated Feb. 14, 2012 issue by the Finnish Patent Office in related Finnish Application No. 20095785 (5 pages).

Extended European Search Report issued Sep. 5, 2012 in related European Patent Application No. 10168197.1 (8 pages).

Communication (Office Action) dated Sep. 25, 2012 issued by the Russian Patent Office in related Russian Patent Application No. 2010128934/08(041038) and English translation thereof (7 pages).

Communication (Decision on Granting Patent for an Invention) dated Feb. 7, 2013 issued by the Russian Patent Office in related Russian Patent Application No. 2010128934/08(041038) and English translation thereof (14 pages).

Communication pursuant to Article 94(3) EPC dated May 13, 2013, issued by the European Patent Office in related European Patent Application No. 10 168 197.1 (6 pages).

Notification of the Second Office Action Issued by Chinese Patent Office in related Application Serial No. 201010228931.9 Dated Aug. 9, 2013 with English translation (14 pages).

* cited by examiner

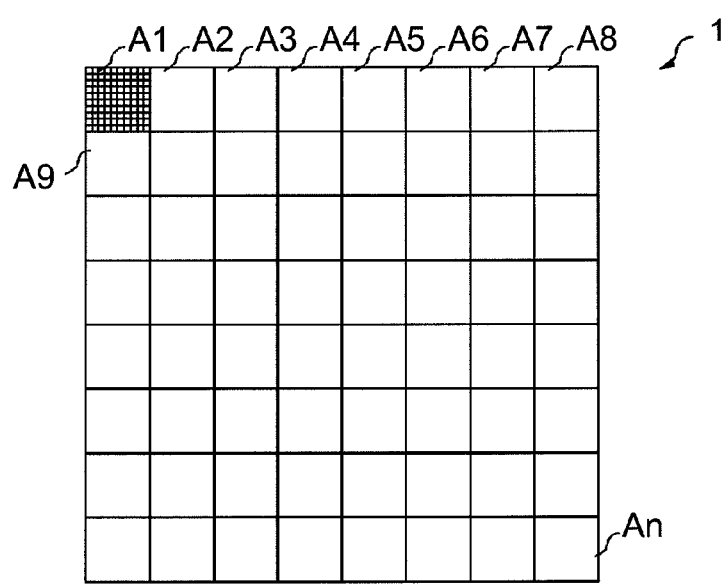
FIG. 1
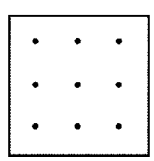 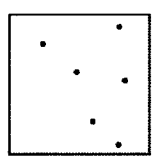 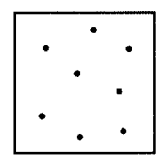 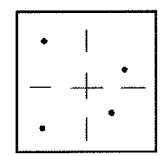 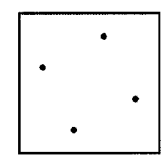
FIG. 2a  FIG. 2b  FIG. 2c  FIG. 2d  FIG. 2e

METHOD FOR RECOGNIZING PATTERN, PATTERN RECOGNIZER AND COMPUTER PROGRAM

FIELD OF THE INVENTION

The invention relates to pattern recognition, in which a received image is monitored in order to find out whether a recognizable pattern appears in the image.

DESCRIPTION OF PRIOR ART

Pattern recognition in a video image requires considerable computing power of equipment employed. Therefore, known solutions do not enable efficient and fast pattern recognition with equipment having lower computing power.

SUMMARY OF THE INVENTION

The object of the present invention is to solve the above-described problem and to provide a new and a more efficient solution than before for recognizing a pattern in an image. This is achieved by the method of independent claim 1, the pattern recognizer of independent claim 6, the computer program of independent claim 12 and the computer readable medium of independent claim 13.

The invention utilizes the possibility of dividing the pattern to be recognized and the image where the pattern is searched for into areas, for which area-specific reference values are calculated on the basis of image information of the areas. Thereafter it is possible to search for a pattern in the image by mutually comparing the reference values of image areas in process and the reference values of areas containing pattern parts. If the image in process then includes a part, where the reference values of the areas correspond, with sufficient accuracy, to the reference values of the areas including pattern parts, it is possible to indicate recognition of a pattern. Performed in this manner, the pattern recognition becomes simpler and faster than before, and consequently the computing capacity of the equipment employed need not be so high as in the prior art solutions.

Preferred embodiments of the method and the pattern recognizer of the invention are disclosed in the attached dependent claims.

BRIEF DESCRIPTION OF THE DRAWINGS

In the following the invention will be described in greater detail, by way of example, with reference to the attached drawings, in which FIG. 1 illustrates division of an image into areas, FIGS. 2a to 2e illustrate sampling of an image area.

DESCRIPTION OF AT LEAST ONE EMBODIMENT

Figure 3:
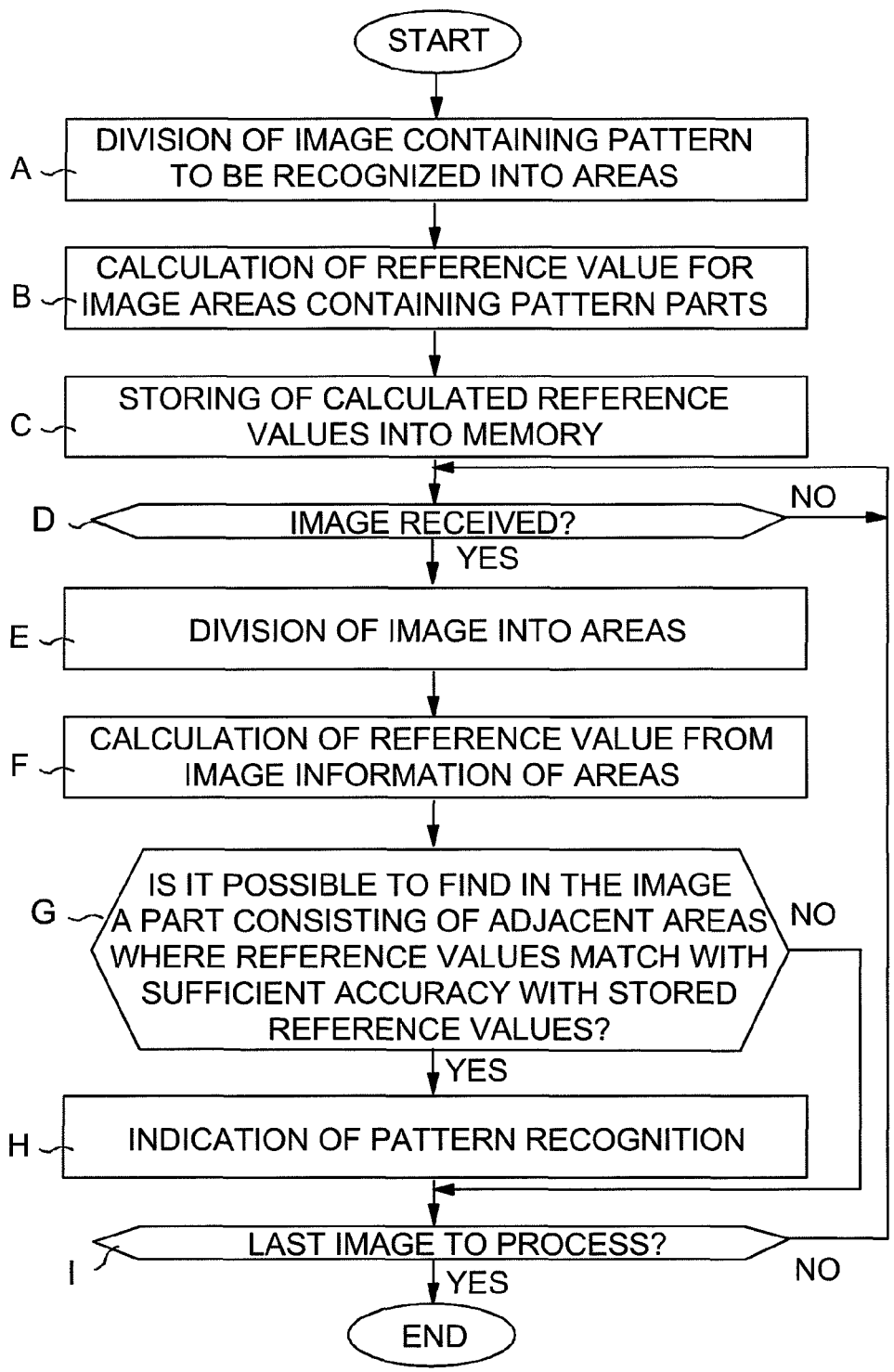
FIG. 3 illustrates a preferred embodiment of the invention.

FIG. 1 illustrates division of an image 1 into areas A1 to An. The number and size of the areas may be selected case-specifically. An option is to divide the image into areas such that each area includes 8×8 pixels. The colour intensity of pixels is preferably at least 24 bits (RGB, Red-Green-Blue), but the best result is achieved by using as deep colour intensity as possible, for instance the colour intensity of 64 bits. A larger movement area requires a better colour depth for implementing a specific area.

FIGS. 2a to 2e illustrate sampling in an image area. By way of example, it may be assumed that FIGS. 2a to 2e show sampling of area A1 in FIG. 1, whereby from image information of said area certain pixels are selected as samples.

Sample selection may be performed by using supersampling technique known per se, whereby in the situation of FIG. 2a there is utilized a grid algorithm for taking nine samples in locations indicated by dots in FIG. 2a. Each sample thus represents a numerical value of the pixel located at said point, the numerical value determining, in practice, the colour of this pixel. Alternatively, the sampling may be performed by a random algorithm (FIG. 2b), Poisson Disc algorithm (FIG. 2c), Jitter algorithm (FIG. 2d) or Rotated Grid algorithm (FIG. 2e).

When the area in process has been sampled as required, a reference value is calculated for said image area on the basis of the samples. The reference value may be calculated to correspond to the mean of the samples, i.e. the numerical values of the pixels, taken in the area. Practical tests have shown that a good result is achieved, for instance, by using an image area of 4×4 or 8×8, supersampling technique and 24-bit colour intensity of pixels and an original image size of 1920×1080 pixels. In that case supersampling may be implemented, for instance, in the following manner by:

1) dividing a source image into equal-sized rectangles, each of the rectangles corresponding to one image area;

2) calculating a weighted sum of all pixels locating inside the rectangle or intersected by the rectangle. If the pixel is located inside the rectangle, this pixel value is given a weight value of 1. If the pixel, which is intersected by the rectangle, and the rectangle have an intersection area a<1, said pixel value is given a weight value of a.

3) for calculating a reference value, dividing the weighted sum by the surface area of the rectangle (expressed as pixels, whereby the surface area is the horizontal number of pixels in the rectangle multiplied by the vertical number of the pixels in the rectangle).

In the above it is explained, by way of example, that all the pixels in the area are taken into account in the calculation of a reference value and that the areas are expressly rectangular in shape. This is not necessary, however, but the reference value calculation may also be performed by sampling only some of the pixels in the area and by dividing the image into areas of other than rectangular shapes, for instance, into triangular areas.

FIG. 3 illustrates a preferred embodiment of the invention.

In step A there is received an image that contains a pattern to be recognized. In this connection the concept "pattern" shall be understood in a broad sense comprising, for instance, parts of human beings, objects or goods as well as various figures, which need to be subsequently recognized, for one reason or another, in the received images. In step A, the image containing the pattern is also divided into areas, for instance, into rectangular, equal-sized areas as described above.

In step B there is calculated a reference value for image areas containing pattern parts. The reference value calculation may be carried out as described above. Each image area containing a pattern part will thus have a specific reference value.

In step C the calculated reference values are stored in memory. In some embodiments it may be advantageous to store in memory not only the reference values but also position data which indicates the mutual location of the areas to which the reference values correpond. After step C, the definition of the pattern to be recognized is completed and next it is possible to start recognizing the pattern to be recognized in the image or images.

In step D reception of images is started. The question may be, for instance, of a video image produced by a video camera and consisting, in practice, of a plurality of individual, successive images.

In step E an individual, received image is divided into areas. The division into areas is carried out in the corresponding manner as in connection with step A.

In step F reference values are calculated for the image areas on the basis of their image information as described above, for instance.

In step G the calculated reference values of the image in process are compared with the reference values stored in the memory. If in the processed image there is found an image part consisting of adjacent areas, where the reference values of the areas correspond, with sufficient accuracy, to the stored reference values, in step H it is indicated that the pattern to be recognized is found. How the pattern recognition is indicated depends on the application. In some situations it is possible to trigger an audio signal, to display the information on a display device or, for instance, to control a device, such as a garage door or a boom of a parking lot, when a vehicle having an allowed registration number is approaching.

It is likely that in all situations the stored reference values of areas containing pattern parts do not fully correspond to the reference values in the image part where the pattern to be recognized is located. Hence, it will suffice that the comparison shows that the reference values correspond to one another with sufficient accuracy. What the sufficient accuracy is, varies case-specifically. For instance, it is possible that the reference values of areas in the part correspond with sufficient accuracy to the stored reference values, in case the proportion of areas which are found in said part and whose reference values correspond to the stored reference values, of all stored values, exceeds a given limit value. The user may thus determine the limit value denoting that the pattern recognition is to be indicated in case e.g. 70% of the stored reference areas are found in said image part. In that case, if the reference values of ten areas containing image parts are stored in the memory and in the image part there are found seven areas for which the reference values correspond to those stored in the memory, pattern recognition is indicated.

It is also conceivable that the reference value comparison does not require absolutely the same value, but that two reference values are deemed to correspond to one another, if they deviate from one another at most for a given variation range defined by the user. Thus, for instance, it may be deemed that a reference value R is found, if the reference value is found within the range of [R−10 . . . R+10].

In practical implementations a neural network is preferably used in step G to deduce whether the pattern is recognized.

In step I it is checked whether the processed image is the last one. If not, the process returns to block D for processing a subsequent image.

In the above it is described by way of example that in connection with pattern recognition it is only indicated that a pattern is recognized. Unlike this, it is also conceivable that in connection with the indication there is also produced information on at least the travel direction and speed of the recognized pattern. In order to enable this, in step H there is stored in the memory information on the location in the image where the pattern was recognized. When the pattern is subsequently recognized in another image, the location of the pattern stored in the memory is compared with its location in another image. Thereafter, on the basis of the locations it is possible to calculate the travel direction. If the point in time when the pattern appeared in the first location is also stored in the memory, and a point in time when it appeared in the second location is found out, it will be possible to calculate the speed of the pattern.

The above-described embodiment is very efficient when several different patterns are to be recognized, for instance. In that case the same memory will contain area-specific reference values for all patterns to be recognized. During reception of images it is sufficient to check if this memory contains the area-specific reference values of the latest received image. If not, no additional checks are needed, but instead, processing of a following received image may begin.

In practice, the steps of FIG. 3 may be implemented, for instance, by a computer program that is stored on a disc or other computer-readable media and that controls a programmable device for implementing steps A to I.

Figure 4:
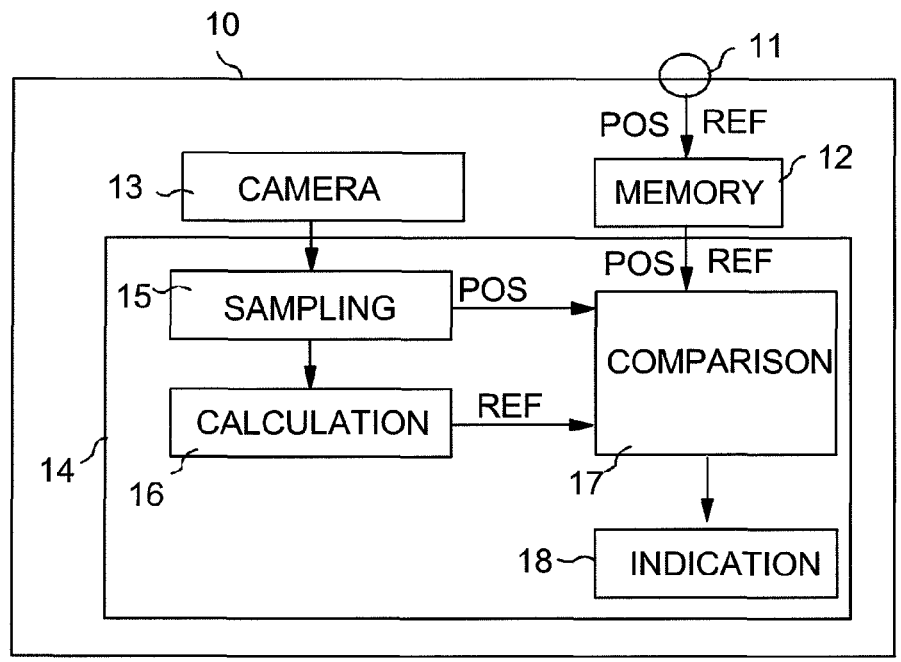
FIG. 4 illustrates a first preferred embodiment of a pattern recognizer.

FIG. 4 illustrates a first preferred embodiment of a pattern recognizer 10. In practice, the pattern recognizer may consist of a programmable device, such as a computer, IP camera, mobile phone or palmtop computer, to which is connected or integrated a camera, and which is arranged to execute the computer program that controls said device.

In the example of FIG. 4 it is assumed, by way of example, that the pattern recognizer 10 receives from an external device calculated reference values REF for areas containing parts of the pattern to be recognized and position data POS representing the mutual locations of the areas corresponding to the reference values. Hence, there is no need to carry out steps A to C of FIG. 3 by means of the pattern recognizer of FIG. 4, but by means of separate equipment. It should be noted that the position data POS need not be considered in all embodiments, but it will be sufficient for the comparison associated with the pattern recognition that the reference values to be compared correspond to each other with sufficient accuracy without considering the mutual location of the corresponding areas.

In the case of FIG. 4 the pattern recognizer 10 includes an input 11, for instance a serial bus, through which the reference values REF and the position data POS are received and stored in the memory 12.

By means of a camera 13 the pattern recognizer 10 generates a video signal that is transmitted to the use of a processor 14. In practice, the processor 14 may be implemented by circuit solutions, computer software or a combination thereof. In this embodiment, a sampling block 15 of the processor divides the received image into areas and performs sampling of the areas as described above. Thereafter, a calculating block 16 of the processor calculates area-specific reference values from the samples. The reference values REF and the position data POS of areas associated therewith and produced by the sampling block are transmitted to a comparison block 17 of the processor 14. The comparison block 17 carries out the comparison described in connection with block G of FIG. 3 by utilizing the data stored in the memory 12. On the basis of the comparison result an indication block 18 of the processor 14 indicates that a pattern is recognized as described in connection with block H of FIG. 3. In connection with the indication it is also possible to produce information on the travel direction and/or speed of the recognized pattern.

Figure 5:
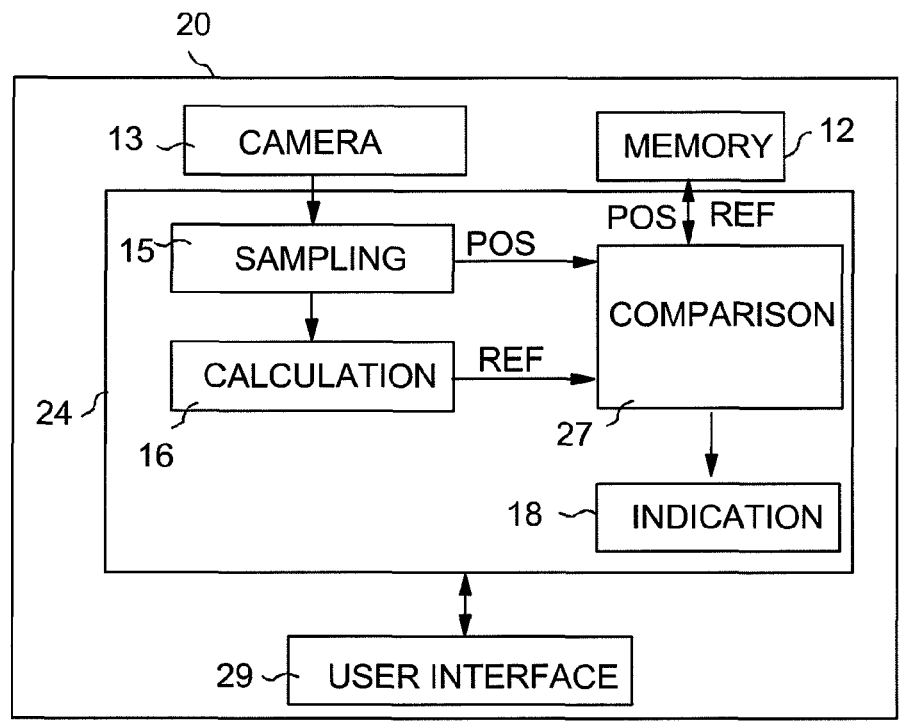
FIG. 5 illustrates a second preferred embodiment of the pattern recognizer.

FIG. 5 illustrates a second preferred embodiment of the pattern recognizer 20. The pattern recognizer of FIG. 5 corresponds to a great extent to the pattern recognizer of FIG. 4, and consequently the embodiment of FIG. 5 is described in the following primarily by highlighting the differences between the embodiments.

The pattern recognizer 20 of FIG. 5 includes a user interface 29, through which the operator of the pattern recognizer may control the processor 24 of the pattern recognizer 20 to carry out the storing of reference values in the memory 12 as described in connection with steps A to C of FIG. 3.

The user interface 29 may include a display and a keyboard, through which the user may indicate in the image produced by the camera 13 the areas where parts of the pattern to be recognized are located. For these areas the sampling block 15, calculating block 16 and comparison block 27 take care that the reference values REF and the relative position data POS are stored in the memory 12. The storing of the position data POS is not necessary in all implementations, as is described above.

Because in the embodiment of FIG. 5 it is possible to take care that reference values REF and the position data POS will be stored in the memory, the input 11 described in connection with FIG. 4 is not needed for this purpose.

It is to be understood that the above description and the relating figures are only intended to illustrate the present invention. It is obvious to persons skilled in the art that the invention may be modified and otherwise altered without deviating from the scope of the claims.

The invention claimed is:

1. A method for determining a recognized pattern of an object in a single received original image in pixel format, comprising:
dividing the single received original pixel image into a plurality of received image areas,
calculating a plurality of area-specific reference values, one for each of the plurality of received pixel image areas, at least one of the area-specific reference values being based upon statistics of less than all of the sample pixel values in the respective received image area, at least one of the area-specific reference values being calculated based upon plurality of the sample pixel values in the respective received image area such that a total number of area-specific reference values is smaller than a total number of sample pixel values,
employing only one comparison step which includes comparing at least one of the calculated area-specific reference values with only first reference values associated with a plurality of pattern parts of objects, and
determining the recognized pattern of the object when two or more adjacent received image areas have area-specific reference values which correspond to two or more of the first reference values by a predetermined percentage.

2. The method of claim 1, wherein the area-specific reference value of the area is calculated by calculating a mean of samples comprising individual pixel values of the area.

3. The method of claim 1, wherein the area-specific reference value of the area is calculated by supersampling.

4. The method of claim 1, wherein the area-specific reference values of the areas in the part correspond, with sufficient accuracy, to the stored reference values if the proportion of areas which are found in said part and whose reference values correspond to the stored reference values of all stored reference values, exceeds a given limit value.

5. The method of claim 1, wherein
when the recognized pattern is found, information on the location of the pattern in the image is stored in the memory, and
when the recognized pattern is found a subsequent time in another image, at least the travel direction or speed of the pattern is calculated on the basis of the location of the pattern and the location of the pattern stored in the memory, and said at least travel direction or speed will be indicated.

6. A pattern recognizer comprising:
a memory for storing area-specific reference values calculated on the basis of image information of image areas containing parts of a pattern to be recognized, and
a processor which is configured:
to divide a single received original pixel image into a plurality of received image areas,
to calculate a plurality of area-specific reference values, one for each of the plurality of received pixel image areas, at least one of the area-specific reference values being based upon statistics of less than all of the sample pixel values in the respective received image area, at least one of the area-specific reference values being calculated based upon a plurality of the sample pixel values in the respective received image area such that a total number of area-specific reference values is smaller than a total number of sample pixel values,
employing only one comparison step to compare the calculated area-specific reference values with first reference values associated with a plurality of pattern parts of objects, and
to determine a recognized pattern of the object when two or more adjacent received image areas have area-specific reference values which correspond to two or more of the first reference values by a predetermined percentage.

7. The pattern recognizer of claim 6, wherein the processor calculates the area-specific reference value of the area by calculating a mean of the samples consisting of individual pixel values of the received image area.

8. The pattern recognizer of claim 6, wherein the processor calculates the area-specific reference value of the area by supersampling.

9. The pattern recognizer of claim 6, wherein
when the recognized pattern is found, information on the location of the pattern in the image is stored in the memory, and
when the recognized pattern is found a subsequent time in another image, at least the travel direction or speed of the pattern is calculated on the basis of the location of the pattern and the location of the pattern stored in the memory, and said at least travel direction or speed will be indicated.

10. The pattern recognizer of claim 6, wherein
the pattern recognizer further comprises a user interface through which the user may select in the image the image areas where parts of the pattern to be recognized appear, and
the processor is configured to calculate area-specific reference values for the image areas selected through the user interface on the basis of the image information of said areas and to store said reference values in the memory.

11. A non-transitory computer readable medium containing a computer program configured to control a programmable device for implementing the method of claim 1.

12. A non-transitory computer readable medium containing a computer program configured to control a programmable device for implementing the method of claim 2.

13. A non-transitory computer readable medium containing a computer program configured to control a programmable device for implementing the method of claim 3.

14. A non-transitory computer readable medium containing a computer program configured to control a programmable device for implementing the method of claim 4.

15. A non-transitory computer readable medium containing a computer program configured to control a programmable device for implementing the method of claim 5.

16. The method of claim 1, wherein the step of dividing the single received image into a plurality of received image areas comprises dividing the single received image into a plurality of equal sized and shaped received image areas.

17. The method of claim 1, further comprising considering position data representing mutual locations of the areas corresponding to the reference values when comparing the calculated area-specific reference values with first reference values associated with a plurality of pattern parts of objects.

18. The pattern recognizer of claim 6, wherein the processor is configured to divide the single received image into a plurality of received image areas by dividing the single received image into a plurality of equal sized and shaped received image areas.

19. The pattern recognizer of claim 6, wherein the processor is further configured to consider position data representing mutual locations of the areas corresponding to the reference values when comparing the calculated area-specific reference values with first reference values associated with a plurality of pattern parts of objects.

20. The method of claim 1, wherein the plurality of area-specific reference values corresponds to pixel image areas of identical size that comprise a plurality of pixels.

21. The pattern recognizer of claim 6, wherein the plurality of area-specific reference values corresponds to pixel image areas of identical size that comprise a plurality of pixels.

* * * * *

UNITED STATES PATENT AND TRADEMARK OFFICE
CERTIFICATE OF CORRECTION

| | | |
|---|---|---|
| PATENT NO. | : 8,615,137 B2 | Page 1 of 1 |
| APPLICATION NO. | : 12/831045 | |
| DATED | : December 24, 2013 | |
| INVENTOR(S) | : Tuomas Kärkkäinen | |

It is certified that error appears in the above-identified patent and that said Letters Patent is hereby corrected as shown below:

Title Page, under "FOREIGN PATENT DOCUMENTS" should read as follows:

--JP 11-85989 A    3/1999--.

Signed and Sealed this
Fifteenth Day of April, 2014

Michelle K. Lee
*Deputy Director of the United States Patent and Trademark Office*